United States Patent
Sutterfield

(10) Patent No.: US 8,844,262 B2
(45) Date of Patent: Sep. 30, 2014

(54) EXHAUST FOR A GAS TURBINE ENGINE

(75) Inventor: David Levi Sutterfield, Greenwood, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 952 days.

(21) Appl. No.: 12/974,995

(22) Filed: Dec. 21, 2010

(65) Prior Publication Data

US 2011/0154804 A1    Jun. 30, 2011

Related U.S. Application Data

(60) Provisional application No. 61/290,728, filed on Dec. 29, 2009.

(51) Int. Cl.

| F02K 3/02 | (2006.01) |
| --- | --- |
| F02K 1/09 | (2006.01) |
| F02K 3/075 | (2006.01) |
| B64D 33/04 | (2006.01) |
| F02C 9/18 | (2006.01) |
| F02K 3/06 | (2006.01) |

(52) U.S. Cl.
CPC ... *F02K 3/02* (2013.01); *F02K 1/09* (2013.01); *F02K 3/075* (2013.01); *B64D 33/04* (2013.01); *F02C 9/18* (2013.01); *F02K 3/06* (2013.01)
USPC ............. 60/226.1; 60/226.3; 60/262; 60/770; 60/771; 239/265.11; 239/265.19; 239/265.25; 239/265.27; 239/265.35

(58) Field of Classification Search
CPC ......... F02K 1/002; F02K 1/006; F02K 1/008; F02K 1/06; F02K 1/09–1/12
USPC .......... 60/226.1, 226.2, 226.3, 262, 770, 771; 239/265.11, 265.13, 265.17–265.27, 239/265.33–265.39
See application file for complete search history.

(56) References Cited

U.S. PATENT DOCUMENTS

| 3,589,132 A | 6/1971 | DuPont |
| --- | --- | --- |
| 4,064,692 A | 12/1977 | Johnson et al. |
| 4,285,194 A | 8/1981 | Nash |
| 4,361,281 A * | 11/1982 | Nash .......................... 239/265.37 |
| 4,397,431 A | 8/1983 | Ben-Porat |
| 4,527,388 A | 7/1985 | Wallace, Jr. |
| 4,569,199 A | 2/1986 | Klees et al. |
| 5,048,286 A | 9/1991 | Stransky et al. |
| 5,050,803 A * | 9/1991 | Wakeman et al. ........ 239/265.35 |

(Continued)

OTHER PUBLICATIONS

International Search Report and Written Opinion, PCT/US2010/062364, Rolls-Royce North American Technologies, Inc., Apr. 8, 2011.

*Primary Examiner* — Phutthiwat Wongwian
*Assistant Examiner* — Steven Sutherland
(74) *Attorney, Agent, or Firm* — Krieg DeVault LLP

(57) ABSTRACT

A gas turbine engine is provided having an offtake passage that in one form is capable of extracting a bypass flow from the engine. The airflow traversing the offtake passage is introduced to an exhaust flow of the gas turbine engine through an offtake outlet. The offtake outlet includes an airflow member that is moveable. A nozzle is also provided for exhaust from the gas turbine engine. In one form the nozzle includes moveable duct members. Flows exiting the offtake outlet and the nozzle can be combined after passing the airflow member and the moveable duct members, respectively.

19 Claims, 5 Drawing Sheets

(56) References Cited

U.S. PATENT DOCUMENTS

| | | | |
|---|---|---|---|
| 6,751,944 B2 | 6/2004 | Lair | |
| 6,820,410 B2 | 11/2004 | Lair | |
| 6,971,229 B2 | 12/2005 | Lair | |
| 7,096,662 B2 | 8/2006 | Wehner | |
| 7,174,704 B2 | 2/2007 | Renggli | |
| 7,178,338 B2 | 2/2007 | Whurr | |
| 7,188,467 B2 * | 3/2007 | Johnson | 60/226.1 |
| 7,272,930 B2 | 9/2007 | Wiebe et al. | |
| 7,533,517 B2 * | 5/2009 | Beutin et al. | 60/231 |
| 7,578,132 B2 | 8/2009 | Webster | |
| 8,356,483 B2 * | 1/2013 | Petty et al. | 60/770 |
| 2002/0134886 A1 | 9/2002 | Seidel | |
| 2004/0006969 A1 | 1/2004 | Whurr | |
| 2005/0103933 A1 | 5/2005 | Lair | |
| 2005/0229586 A1 | 10/2005 | Whurr | |
| 2007/0245711 A1 | 10/2007 | Stretton | |
| 2008/0022690 A1 | 1/2008 | Chanez et al. | |
| 2008/0236167 A1 | 10/2008 | Dussillols et al. | |
| 2009/0016874 A1 | 1/2009 | Corsmeier et al. | |

* cited by examiner

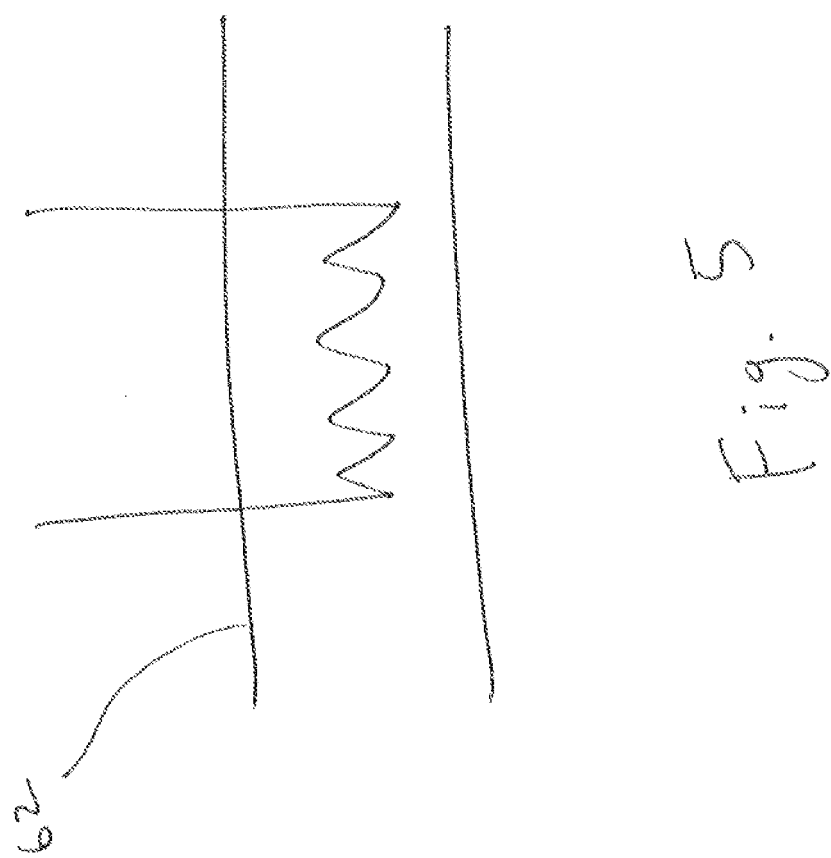

EXHAUST FOR A GAS TURBINE ENGINE

CROSS REFERENCE TO RELATED APPLICATIONS

The present application claims the benefit of U.S. Provisional Patent Application 61/290,728, filed Dec. 29, 2009, and is incorporated herein by reference.

GOVERNMENT RIGHTS

The present application was made with the United States Government support under Contract No. F33615-03-D-2357 awarded by the United States Air Force. The United States Government has certain rights in the present application.

TECHNICAL FIELD

The present invention generally relates to exhaust flows of gas turbine engines, and more particularly, but not exclusively, to combining exhaust flows of gas turbine engines.

BACKGROUND

Extracting airflow from flow paths of gas turbine engines and reintroducing the airflow to other flows of the gas turbine engines remains an area of interest. Some existing systems have various shortcomings relative to certain applications. Accordingly, there remains a need for further contributions in this area of technology.

SUMMARY

One embodiment of the present invention is a unique gas turbine engine exhaust. Other embodiments include apparatuses, systems, devices, hardware, methods, and combinations for combining exhaust flows of gas turbine engines. Further embodiments, forms, features, aspects, benefits, and advantages of the present application shall become apparent from the description and figures provided herewith.

BRIEF DESCRIPTION OF THE FIGURES

FIG. 5 depicts one embodiment of the present application.

DETAILED DESCRIPTION OF THE ILLUSTRATIVE EMBODIMENTS

Figure 1:
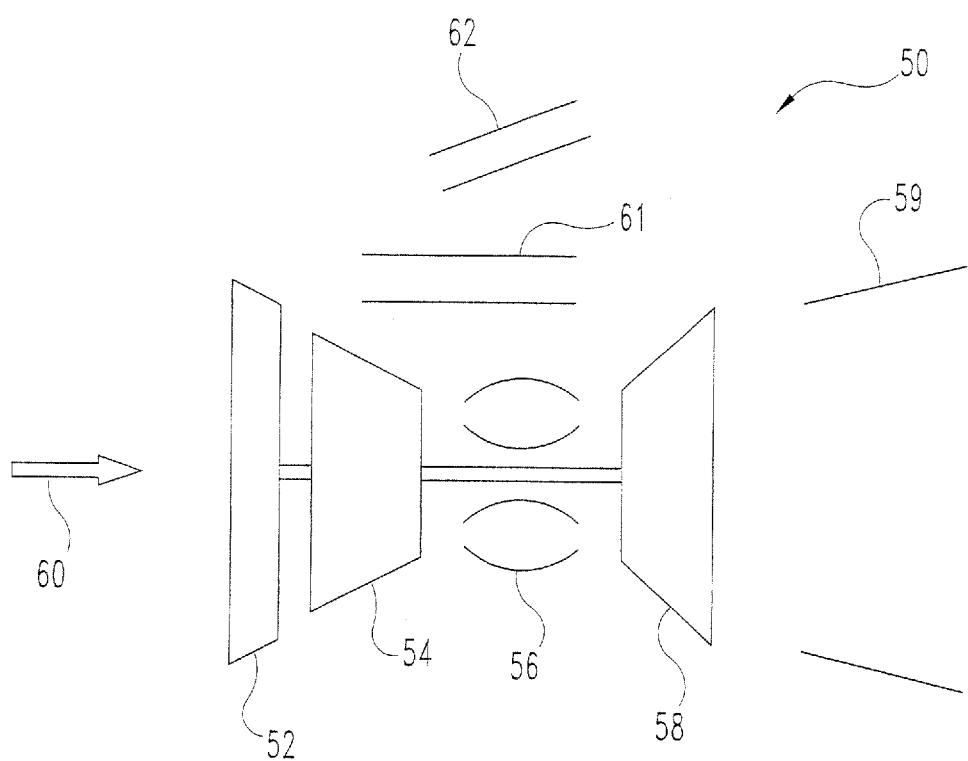
FIG. 1 depicts a schematic of one form of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of a gas turbine engine 50 used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. The gas turbine engine 50 includes a fan 52, compressor 54, combustor 56, and turbine 58. In one form of operation, a working fluid 60 such as air entering the gas turbine engine 50 is accelerated by the fan 52. Some of the working fluid enters the core engine which includes the compressor 54, combustor 56, and turbine 58, and some of the working fluid bypasses the core engine and flows in a bypass duct 61. After passing through the core engine an exhaust flow is discharged through a nozzle 59. In some forms the working fluid passing through the bypass duct 61 is combined with the exhaust flow prior to being discharged through the nozzle 59.

The gas turbine engine 50 can take any variety of forms. For example, the gas turbine engine 50 can have any number of spools capable of driving any number of compressor 54 and turbine 58 sections. In some forms the gas turbine engine 50 can be an adaptive cycle, variable cycle, or combined cycle engine and can be used at a variety of flight conditions.

The gas turbine engine 50 also includes an offtake passage 62 operable to withdraw a portion of working fluid traversing through the gas turbine engine 50. The offtake passage 62 is operable to withdraw a quantity of working fluid 60 to provide an additional thrust capability to the propulsion system and/or to provide an additional stream of pressurized air for use as a coolant or energy source. The relatively low temperature of the working fluid though the offtake passage 62 can provide a thermal management heat sink and could allow use of relatively economical materials in exhaust ducting and liners. In one form the offtake passage 62 can convey a quantity of working fluid 60 to be used as an additional energy source to provide power for electrical or mechanical devices. In one non-limiting embodiment the offtake passage 62 can withdraw working fluid 60 from a bypass duct 61 downstream of the fan 52. Other locations are also contemplated herein. The working fluid 60 withdrawn can be recombined with an exhaust flow of the gas turbine engine 50 prior to being exhausted to ambient conditions, embodiments of which are described further below.

Figure 2:
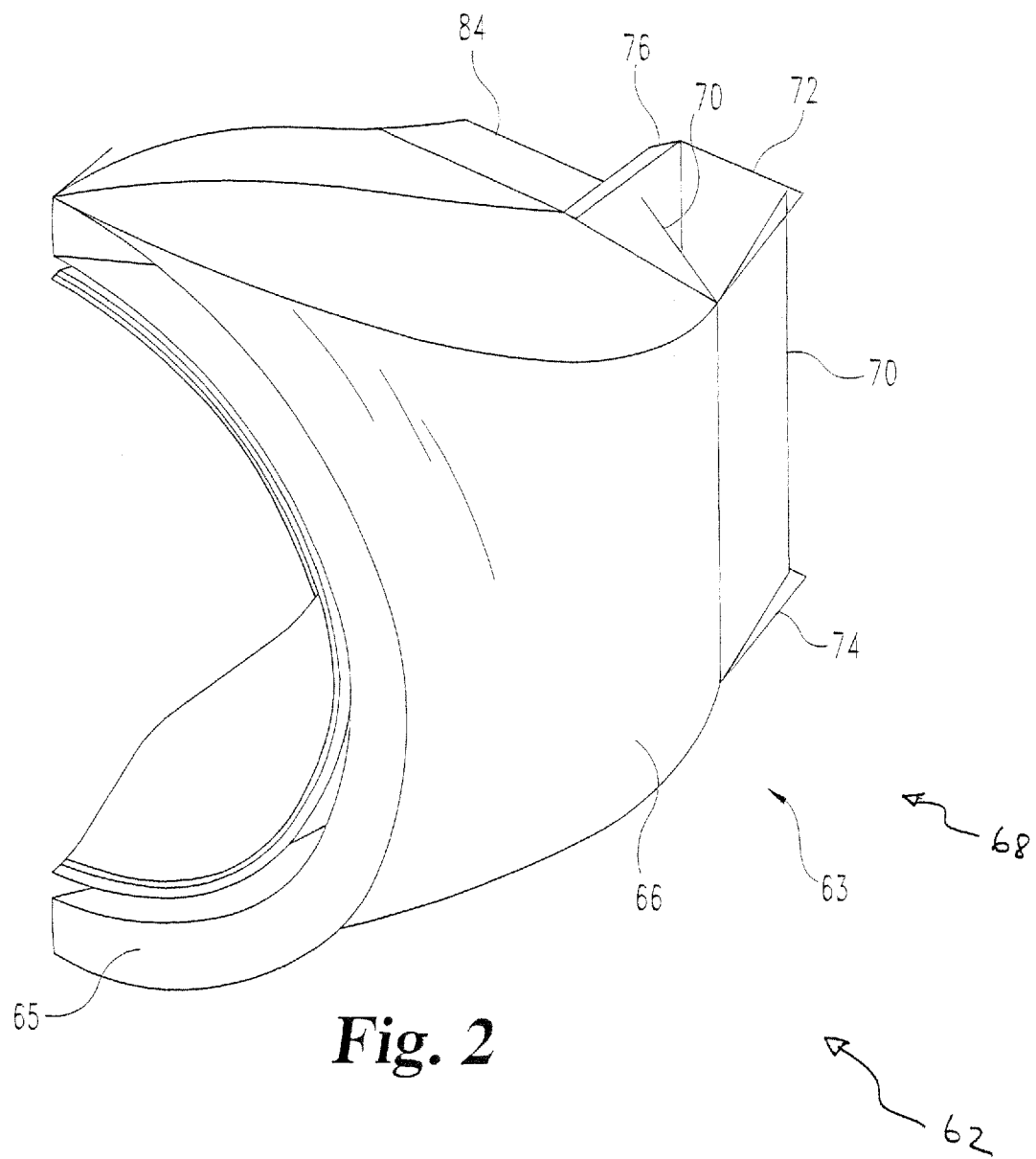
FIG. 2 depicts one embodiment of the present application.
Figure 3:
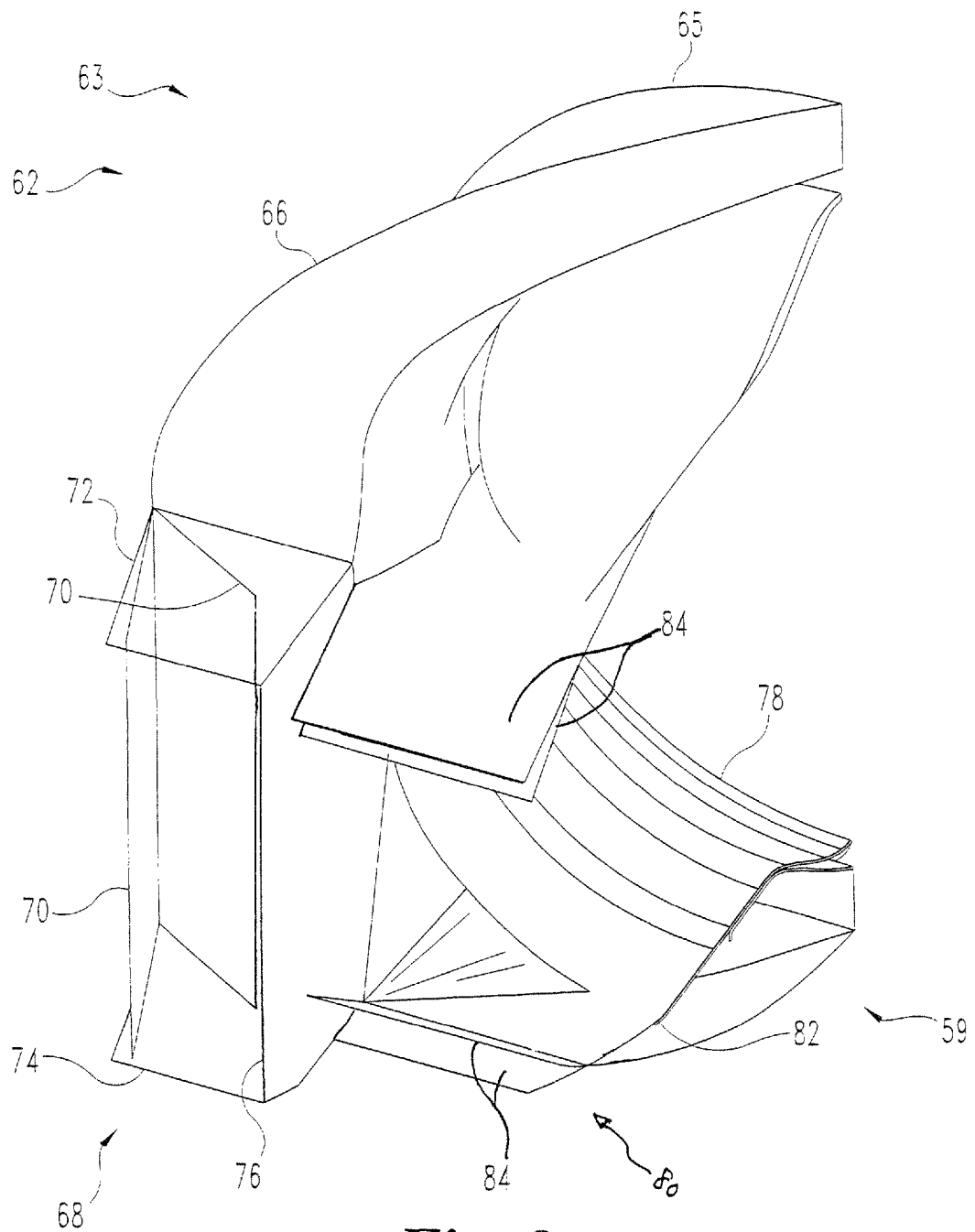
FIG. 3 depicts one embodiment of the present application.
Figure 4:
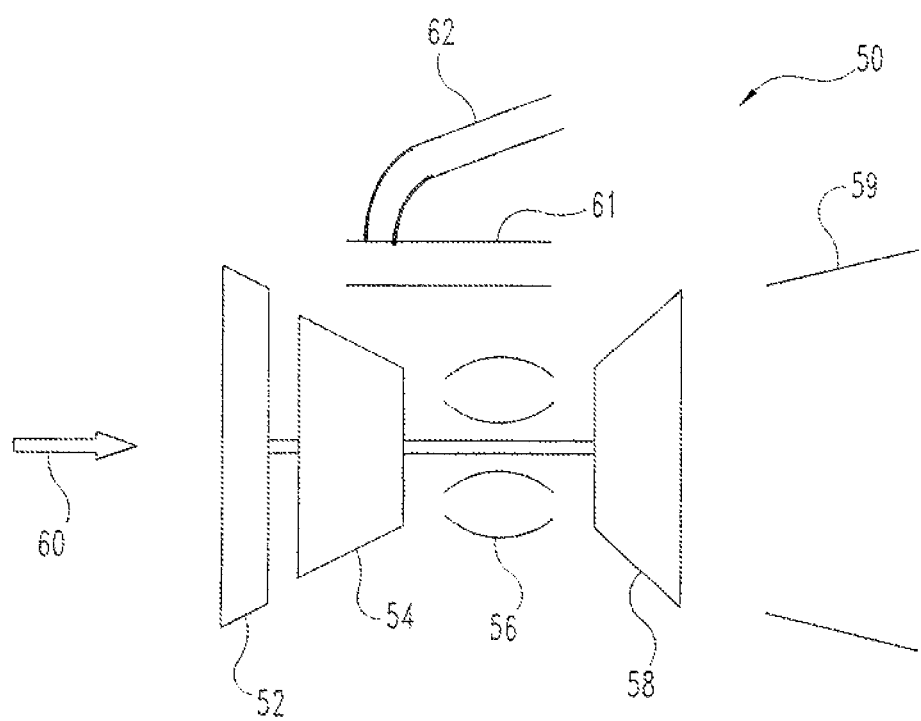
FIG. 4 depicts one embodiment of the present application.

Turning now to FIGS. 2-3, one embodiment of the offtake passage 62 includes an airflow duct 63 that passes offtake flow located near the downstream end of the offtake passage 62. The airflow duct 63 is shown in FIGS. 2-3 as viewed from a position looking aft and a position looking forward, respectively, and extends from an upstream inlet 65 to a downstream outlet 68. FIGS. 2 and 3 depict a semi-annular airflow duct 63. The inlet 65 and outlet 68 are not limited to the precise shape and orientation as depicted in the figures and rather can have a variety of shapes and orientations. In some embodiments a mirror image, or other similar corresponding duct work, of the airflow duct 63 can be provided to create a bifurcated airflow duct 63 having a substantially annular inlet and two separate outlets. In some forms the airflow duct 63 is not bifurcated but is annular. In other forms the airflow duct 63 can have vanes or other structures extending across the duct 63. The airflow duct 63, whether in the form shown in the illustrative embodiment or in the form having two mirror image ducts 63, can be a unitary structure or can be an assembly of separate components. In at least the embodiment having a bifurcated duct, when working fluid traverses through the offtake passage 62 it is bifurcated when encountering the two halves of the substantially annular inlet. Any number of other variations are contemplated herein.

The airflow duct 63 can include a transition section 66 used to change a cross-sectional shape of the offtake passage 62 from one shape to another. In the illustrated embodiment the transition section 66 changes from an upstream semi-annular shape, as depicted in FIG. 2, to a downstream rectangular shape near the outlet 68 as can best be seen in FIG. 3. In the illustrative embodiment the outlet 68 is rectangular in shape but can take on other shapes in different embodiments. In one form the transition section 66 maintains a substantially constant cross sectional area from the inlet 65 to the outlet 68. In other embodiments, however, the transition section 66 can have a cross-sectional area that varies as the transition section 66 moves from the upstream portion to the downstream outlet 68. Such a variation in cross-sectional area can provide a diffusion for a working fluid traversing through the transition section 66.

In the illustrated embodiment the outlet 68 includes an airflow member 70 operable to change the characteristics, such as velocity and/or direction, of a working fluid exiting the outlet 68. The airflow member 70 can take the form of a flap hinged at one end and operable to extend toward and away from the airflow duct 63, although other directions may be possible in other embodiments. Though the airflow member 70 is shown as rotatable about a hinge, in some embodiments the airflow member 70 can be structured to move in translation such as by a sliding action, among other possibilities. The airflow member 70 affects a direction of at least some of the working fluid traversing through the offtake passage 62. In one form the airflow member 70 sets the throat area of the offtake passage 62, although in other forms the airflow member 70 can set other areas of the offtake passage 62 whether or not considered a throat area. The airflow member 70 is shown in two different operating positions in each of FIGS. 2 and 3; consequently, although two reference numerals are used, only one airflow member is actually present in the illustrative embodiment. In other embodiments, the airflow member can take other forms and may include multiple members or portions that may articulate, translate, and/or rotate to affect a direction in at least some of the working fluid traversing through the offtake passage 62. In embodiments having at least two airflow ducts forming a bifurcated airflow duct, the airflow members 70 disposed on opposite sides can be independently movable and need not be actuated in unison to similar positions.

The outlet 68 can also include a variety of duct members, such as duct members 72, 74, and 76 which, in the illustrated form, partially define the outlet 68. In one form the duct members 72, 74, and 76 are relatively fixed, but in other embodiments one or more can be moveable either independently or in concert with airflow member 70.

The nozzle 59 includes an upstream section 78 and a duct outlet 80 that serves to pass at least a core flow from the gas turbine engine 50. In one form the nozzle 59 can also include a duct transition 82. In the illustrative embodiment the duct transition 82 changes from circular in shape at the upstream section 78 to quadrilateral in shape at the duct outlet 80. Either or both upstream section 78 and duct outlet 80 can have different shapes in other embodiments. In some forms the upstream section 78 may have the same or similar shape as the duct outlet 80. The airflow duct 63 can have a relatively constant cross sectional shape in some embodiments and may vary in others.

The duct outlet 80 can include one or more of duct members, such as moveable duct members 84, operable to change the characteristics, such as velocity and/or direction, of a working fluid exiting the duct outlet 80. In some forms the moveable duct members 84 can be used to trim the gas turbine engine 50 to a desired operating point. In the illustrative embodiment, two duct members 84 are shown, one each on different sides of the nozzle 59. The moveable duct members 84 can take the form of flaps hinged at one end and operable to extend toward and away from each other. Other directions are also contemplated herein. The duct members 84 need not move in unison and can be independently variable. The moveable duct members 84 in the illustrative embodiment are disposed on both ends of the outlet 68. In some embodiments a moveable duct member can be disposed on a side of the duct outlet 80 adjacent the outlet 68 of the offtake passage 62. Though the moveable duct members 84 are shown as rotatable about a hinge, in some embodiments the moveable duct members 84 can be structured to move in translation such as by a sliding action, among other possibilities. The moveable duct members 84 affect a direction of at least some of the working fluid traversing through the duct outlet 80. In one form the moveable duct members 84 set the exit area of the duct outlet 80. The moveable duct members 84 are shown in two positions in each of FIGS. 2 and 3; although two reference numerals are used in the Figs., only one member is actually present in the illustrative embodiment. In other embodiments, the airflow member can take other forms and may include multiple members or portions that may articulate, translate, and/or rotate to affect a direction in at least some of the working fluid traversing through the duct outlet 80.

In one form the downstream outlet 68 has a cross sectional area that is about 400 square inches and the duct outlet 80 has a cross sectional area that is about 900 square inches. In embodiments having two quadrilateral shaped outlets the total cross sectional area is 800 square inches. The areas of either the duct outlet 80 and/or the downstream outlet 68 can vary according to movement of portions of the outlets.

In operation of one embodiment of the gas turbine engine 50, airflow from the third stream offtake 62 is discharged through the downstream outlet 68 having a variable area. The airflow member 70 can be pivoted to modulate the area of the downstream outlet 68. The airflow member 70 can alternatively and/or additionally be used to vector the airflow exiting the downstream outlet 68. An exhaust gas that includes bypass air of the gas turbine engine 50 is discharged through the duct outlet 80. A duct member 84 can be used to change the exit area of the duct outlet 80 and can be used to alternatively and/or additionally vector the airflow exiting the duct outlet 80. Operation of the gas turbine engine may required the airflow members 70 and duct members 84 to operate independently to vary and/or vector the airflow exiting each of outlet 80 and outlet 68, respectively. For example, in one form of operation the airflow members 70 may operate independent of duct members 84. The duct member 84 and airflow member 70 can be used to produce maximum thrust from the gas turbine engine 50 at a take-off point and then be reconfigured to provide minimum specific fuel consumption at a cruise point.

One aspect of the present application provides an apparatus comprising a gas turbine engine having an exhaust system, the exhaust system including a first outlet operable to flow a stream that includes a fan bypass flow from a gas turbine engine and a second outlet operable to flow a working fluid withdrawn from an upstream location within the gas turbine engine, the first outlet having a movable first outlet structure operable to alter a portion of the stream in a first outlet structure direction, the second outlet having a movable second outlet structure operable to alter a portion of the working fluid in a second outlet structure direction, and wherein the stream from the first outlet is combined with the working fluid from the second outlet during operation of the gas turbine engine.

Another aspect of the present application provides an apparatus comprising a turbofan engine having an exhaust flowpath operable to flow a core flow, a bypass flow, and an offtake stream, the exhaust flowpath including a variable area first passage having a first movable component and a variable area second passage having a second movable component, wherein a fluid that has passed at least partially through the variable area first passage merges with an offtake flow that has passed at least partially through the variable area second passage during operation of the turbofan engine.

Yet a further aspect of the present application provides an apparatus comprising a gas turbine engine having a first flow passage that includes a flow having a fan flow, and a second flow passage that includes a flow having an offtake stream flow, and means for combining the flow from the first flow passage with the flow from the second flow passage.

Still a further aspect of the present application provides a method comprising bypassing a fan flow through a first duct around a core of a gas turbine engine, withdrawing an offtake flow from the gas turbine engine into a second duct, combining the fan flow with the offtake flow, and altering a flow area of at least one of the first duct and the second duct.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having an exhaust system, the exhaust system including a first outlet operable to flow a stream that includes a fan bypass flow from a gas turbine engine and an opposing pair of outlets disposed on opposite sides of the first outlet and operable to flow a working fluid withdrawn from the fan bypass flow, the first outlet having a movable first outlet structure operable to alter a portion of the stream in a first outlet structure direction, the opposing pair of outlets fed from a bifurcated flow of the working fluid withdrawn from the fan bypass flow having opposing movable second outlet structures operable to alter a portion of the working fluid in a second outlet structure direction; and
wherein the stream from the first outlet is combined with the working fluid from the opposing pair of outlets during operation of the gas turbine engine.

2. The apparatus of claim 1, wherein the first outlet structure direction is different than the second outlet structure direction, and which further includes a bifurcated duct located upstream of the opposing pair of outlets, each of the two flow paths of the bifurcated duct structured to provide the bifurcated flow of the working fluid to respective outlets of the opposing pair of outlets.

3. The apparatus of claim 2, wherein the movable second outlet structure direction includes a direction toward the first outlet to assist in merging the working fluid from the second outlet and the stream from the first outlet.

4. The apparatus of claim 3, wherein the movable second outlet structure is operable to change a flow area in the second outlet in response to changes in operation of gas turbine engine.

5. The apparatus of claim 2, wherein the opposing movable second outlet structure are structured to rotate in a direction toward the first outlet, wherein the opposing pair of outlets are rectangular in shape, and wherein the opposing movable second outlet structures are hinged flaps.

6. The apparatus of claim 5, wherein the movable first outlet structure is capable of vectoring a direction of the stream.

7. An apparatus comprising:
a turbofan engine having an exhaust flowpath operable to flow a core flow, a bypass flow, and an offtake stream, the offtake stream flowing through a flow bifurcation structured to form a first offtake stream and a second offtake stream, the exhaust flowpath including a variable area first passage having a first movable component and a pair of variable area second passages, each of the pair structured to flow one of the first offtake stream and the second offtake stream, the pair of variable area second passages each having a second movable component; and
wherein the core flow that has passed at least partially through the variable area first passage merges with both the first offtake stream and the second offtake stream that have passed at least partially through the pair of variable area second passages during operation of the turbofan engine.

8. The apparatus of claim 7, wherein the variable area first passage includes a transition from circular to quadrilateral.

9. The apparatus of claim 8, which further includes a third movable component, wherein the first movable component is disposed on one side of the variable area first passage and the third movable component is disposed on another side of the variable area first passage.

10. The apparatus of claim 8, wherein the variable area second passage includes a bifurcated duct upstream of the second movable component.

11. The apparatus of claim 10, wherein second movable component is operable to alter a throat area of the variable area second passage.

12. The apparatus of claim 11, wherein second movable component is rotatable.

13. The apparatus of claim 12, wherein the variable area second passage includes a quadrilateral shaped duct having an end operable to direct a flow from the variable area second passage toward the variable area first passage.

14. A method comprising:
bypassing a fan flow through a first duct around a core of a gas turbine engine;
withdrawing an offtake flow from the fan flow of the gas turbine engine into a second duct;
bifurcating the offtake flow into a first offtake flow flowing through a first offtake flow duct and a second offtake flow flowing through a second offtake flow duct;
combining the fan flow with the first offtake flow and the second offtake flow; and
altering an exhaust flow area of at least one of the first duct and the second duct.

15. The method of claim 14, which further includes transitioning a flow path that contains a gas turbine engine flow that includes the fan flow from a circular flowpath to a non-circular flowpath.

16. The method of claim 15, which further includes exchanging heat between the offtake flow and an energy source.

17. The method of claim 14, which further includes bifurcating the offtake flow upstream of the combining.

18. The method of claim 14, wherein the altering includes actuating an airflow member and wherein the altering occurs upstream of the combining.

19. The method of claim 14, which further includes:
actuating an airflow member to alter the flow area; and
cooperatively modulating the flow area of the first duct and the second duct to improve a performance of a gas turbine engine.

* * * * *